United States Patent [19]
Carpino et al.

[11] 3,835,175
[45] Sept. 10, 1974

[54] 9-FLUORENYLMETHANOL HALOFORMATES, CARBONATES AND THIOCARBONATES

[75] Inventors: Louis A. Carpino; Grace Y. Han, both of Amherst, Mass.

[73] Assignee: Research Corporation, New York, N.Y.

[22] Filed: Mar. 15, 1971

[21] Appl. No.: 124,479

[52] U.S. Cl. ......... 260/463, 260/112.5, 260/295 N, 260/295 R, 260/326 A, 260/326.14 T, 260/326.3, 260/349, 260/455 B, 260/465 D, 260/935, 260/482 C, 260/514 J, 260/534 R, 260/534 A, 260/534 B, 260/534 C, 260/534 E, 260/534 G, 260/534 L, 260/534 M, 260/534 S

[51] Int. Cl. C07c 69/00, C07c 103/50, C07c 103/52

[58] Field of Search ................... 260/463, 455 B

[56] References Cited
UNITED STATES PATENTS
2,870,057  1/1959  Hartle et al. ............. 260/463 X
3,546,165  12/1970  Morgan ..................... 260/47

OTHER PUBLICATIONS

Chemical Abstracts, vol. 50, 10695a (1956).
Chemical Abstracts, vol. 64, 2155e (1966).

*Primary Examiner*—Lewis Gotts
*Assistant Examiner*—Diana G. Rivers
*Attorney, Agent, or Firm*—Cooper, Dunham, Clark, Griffin & Moran

[57] ABSTRACT

The invention disclosed herein is generally concerned with novel 9-fluorenylmethyloxycarbonyl compounds and their reactions. More particularly, it is concerned with these novel compounds and their utility in the preparation of peptides, especially as blocking reagents for protection of free amino or carboxyl groups in amino acids or peptides. The compounds are also useful for separating racemic mixtures into their optical isomers.

2 Claims, No Drawings

9-FLUORENYLMETHANOL HALOFORMATES, CARBONATES AND THIOCARBONATES

BACKGROUND OF INVENTION

The synthesis of peptides, particularly peptides of both high and low molecular weight is a problem which has long challenged the art. Such products are useful as stepping stones in the synthesis of proteins. Some of them are therapeutically active. They are also useful in the study and analysis of proteins, especially in studies designed to gain insight into the mode of action of enzymes, hormones, and other proteins with important functions in the body.

The synthesis of peptides whether dipeptides combining two amino acids, tripeptides combining a dipeptide and an amino acid, tetrapeptides, pentapeptides, higher peptides and even proteins such as bradykinin, tyrocidin, insulin or the growth hormone normally follow synthetic sequences requiring five steps for the formation of each peptide bond. These are:

1. Protection of the amino group on an amino acid,
2. Protection of the carboxyl group on another,
3. Activation of the carboxyl group on the first amino acid,
4. Formation of a peptide bond, and
5. Removal of the group protecting the amino group on the first amino acid.

The problems associated with each of these steps are well known in the art and do not require elaboration here. Perhaps the most important problem is that the amino protecting group be readily removed without cleavage of the peptide bond. Another very significant problem is that the entire sequence take place with an absolute minimum of racemization, preferably no racemization. It is readily apparent that in a multistep synthesis involving even 10 amino acids (a relatively low molecular weight polypeptide) as little as 1 percent racemization at each step becomes a major problem.

A number of blocking reagents for amino groups are known in the art and have been extensively utilized in the synthesis of peptides. However, no completely satisfactory reagent has yet become known which can be removed or cleaved under mildly alkaline non-hydrolytic conditions. Most blocking groups are removed under acid conditions, for example, trifluoroacetic acid, hydrobromic acid, hydrochloric acid, and the like; or strongly alkaline conditions such as sodium in liquid ammonia. Some amino acids used in peptide formation, such as tryptophane are unstable under acid conditions. Strongly alkaline reagents often cause racemization. The discovery of a blocking group which can be removed under mildly alkaline conditions is therefore a major advance in the art.

A particular advantage of the blocking reagents of this invention is that they can also be used to protect carboxyl groups.

Another important utility for the compounds of this invention is that certain of them are useful for separation of racemic mixtures.

THE INVENTION

This invention is concerned with novel 9-fluorenylmethyloxycarbonyl compounds which may be substituted or unsubstituted and which are particularly characterized by the presence of a hydrazino group or a functional group attached to the carbon atom of the carbonyl function which will condense with the amino group of an amino substituted compound to form a 9-fluorenylmethoxycarbonyl derivative thereof. It is concerned also with the utility of these compounds in the formation of peptides and in the separation of racemic mixtures.

In its broadest aspect this invention is concerned with 9-fluorenylmethyloxycarbonyl compounds which may be unsubstituted or substituted with one or more reaction inert substituents. A substituent, if present, may be on the alpha carbon atom, that is the carbon atom attached to the 9-position of the fluorene nucleus, or it may be on one or both of the fused phenyl rings of the nucleus. The term "reaction inert" means that the substituent remains attached to the alpha carbon atom or the fluorene nucleus during the reaction being utilized. It may affect the reaction for exemple, by increasing or decreasing the rate. Typical reaction inert substituents which may be substituted on one or more positions include alkyl groups, especially lower alkyl groups containing up to six carbon atoms, aryl groups including heteroaryl groups containing, for example, up to ten carbon atoms, halogen atoms, the cyano group or the nitro group.

The unsubstituted compounds are generally suitable for most reactions involved in peptide synthesis, although substituted compounds may also be usefully employed to permit variations in the conditions under which the condensation between the amino group and the 9-fluorenylmethoxycarbonyl group is removed. When the compound is to be utilized for the separation of racemic mixtures, the 9-flourenylmethoxycarbonyl compound itself must be asymmetric. The preferred compounds are those with only one substituent on the fluorene nucleus. Alternatively two or more substituents may be present, but their positions on the nucleus will be such that there will be no plane of symmetry.

Typical compounds within the scope of this invention include compounds of the formula:

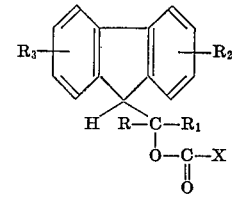

wherein each of R and $R_1$ are hydrogen, alkyl or aryl containing up to about eight carbon atoms; each of $R_2$ and $R_3$ are hydrogen, fluorine, chlorine, bromine, iodine or nitro; and X is chlorine, fluorine, bromine, cyano, thioalkyl or thioaryl wherein the alkyl or aryl group contains up to about ten carbon atoms, substituted and unsubstituted aryloxy containing up to about 10 carbon atoms wherein the aryl group if substituted is preferably substituted on at least one position with an electron attracting substituent, hydrazino, $-N_3$,

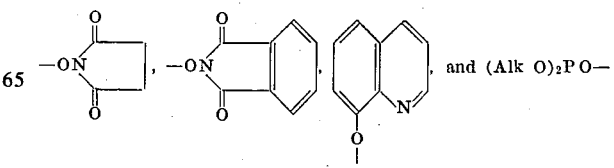

where Alk is a lower alkyl group containing up to six carbon atoms.

The compounds are useful to prepare protected amino acids or peptides which may be represented by the formula:

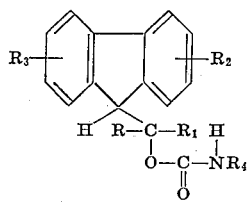

wherein R, $R_1$, $R_2$ and $R_3$ have the same meaning assigned above and $R_4$ is an amino acid or peptide residue.

Preparation of Novel Compounds

The general procedures by which the 9-fluorenylmethoxycarbonyl compounds of this invention may be prepared are illustrated by the following equations wherein R is

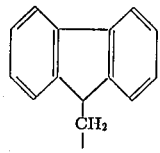

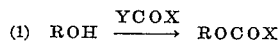

wherein X=Y=Cl, Br, F, CN
X=Cl; Y=SAlk, SAr, OAr, F

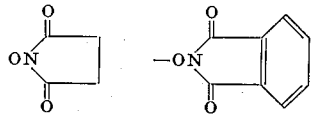

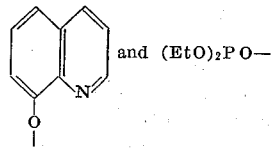

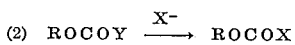

Y=Cl, Br; X=F, $N_3$, CN

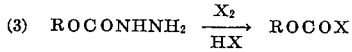

X=Cl, Br

Typically, reactions such as indicated by Equation (1) are carried out in a reaction inert organic solvent, suitably a halogenated hydrocarbon solvent containing up to about six carbon atoms such as methylene chloride or ethylene dichloride at a temperature of from about 0°C. to 25°C. during a reaction period of from about 1 to 6 hours. Suitable yields are obtained with equimolar quantities of reactants although the yield may often be appreciably increased by utilizing a molar excess of either one of them, for example, up to about a 20 percent molar excess. Generally speaking, the halogen substituted compounds are prepared under less rigorous reaction conditions than are required for the preparation of those compounds wherein the substituent is of higher molecular weight, for example, a phthalimido substituted compound. The presence of an organic base, preferably a tertiary amine such as pyridine, triethylamine or quinoline may increase the rate of reaction. Up to a molar equivalent of the amine is preferably used, based on the molar amount of the halogen substituted compound employed.

Reactions of Equation (2) in which the substituent placed on the carbonyl carbon atom is initially present in an ionic form are carried out in reaction inert polar organic solvents which will enhance ionization including, for example, acetonitrile, dimethylformamide, dimethylsulfoxide, tetrahydrofuran, dioxane and others containing up to about eight carbon atoms. The reaction is normally carried out at a temperature of from about 0°C. to 25°C. during a period of from about 1 to 5 hours. Preferably equimolar quantities of reactants are employed to minimize side reactions but a moderate excess of either reactant would not introduce appreciable difficulties.

Reactions of Equation (3) are typically effected by taking up the hydrazide in a reaction inert organic solvent suitably a nitroalkane containing two or three carbon atoms or a halogenated hydrocarbon containing up to about eight carbon atoms, bubbling in a slight excess of the selected anhydrous hydrogen halide and thereafter bubbling in the selected halogen. The course of the reaction can often be followed because the hydrogen halide salt of the hydrazide precipitates from solution and the carboxy halide redissolves as it is formed. Typically, the reaction will be carried our at a temperature of from about 0°C. to 25°C. during a reaction period of from about 1 to 4 hours.

The hydroxymethyl group may be introduced at the 9-position of the selected fluorene starting compound by formylation followed by reduction with a mild reducing agent. For example, the initial reaction could be between fluorene and methyl formate in the presence of sodium ethoxide. The resulting compound could be reduced with aluminum isopropoxide or a metal hydride. The following equation is typical

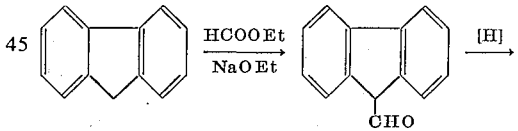

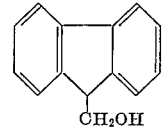

If formaldehyde is used in place of the ester and a strong base such as sodium hydride or sodamide is employed, the hydroxymethyl group can be introduced directly.

Compounds in which the alpha carbon atom is substituted may be prepared by reaction between the selected fluorene compound and an aldehyde other than formaldehyde or a ketone, suitably acetaldehyde, butyraldehyde, acetone or acetophenone in the presence of sodium hydride.

Substituents in the fused phenyl rings can be introduced by known procedures, for example direct bromination in the presence of metallic iron or direct nitration. Amongst the known compounds which may be employed for the preparation of compounds within the scope of the invention are, for example:

a. 1-, 2-, 3- and 4- mono chloro, bromo, fluoro, iodo and nitro;
b. 2,7-, 2,6- and 3,6- di chloro, bromo, fluoro, iodo and nitro;
c. octafluoro.

Preparation of Blocked Amino Acids and Peptides

The compounds of this invention can be used as blocking agent for amino and carboxylic groups of all types of amino acids and peptides including neutral, acidic and basic. They are applicable, for example, to aliphatic amino acids including glycine, alanine, serine, valine, leucine and isoleucine. They are applicable to aromatic amino acids including, for example, phenylalanine, tyrosine, methionine and proline. Acidic amino acids such as aspartic or glutamic, and basic amino acids such as arginine and lysine can also be blocked. The compounds can also be used to block other functional groups with reactive hydrogen atoms in amino acids and peptides including hydroxyl and sulfhydryl groups.

The term "peptides" as used in this section and in the claims is used in the broad sense to cover dipeptides, tripeptides, tetrapeptides, octapeptides as well as peptides of very high molecular weight, even up to the area of proteins.

atom to split out a compound containing the hydrogen atom and the leaving group. Leaving groups are generally electron attracting groups either because of their electro-negativity or because they have an inductive effect. Generally speaking, the functional groups are ones which will condense with an amino group of an amine, particularly an amino acid to form a 9-flourenylmethoxycarbonyl derivative of the amine.

Typical functional groups of this nature are illustrated above.

If the functional group is halogen, especially chlorine, reaction may be effected in a reaction insert, polar organic solvent such as dioxane, tetrahydrofuran, dimethylformamide, pyridine or other solvent containing, for example, up to eight carbon atoms under alkaline conditions, typically dilute aqueous alkali metal base such as sodium or potassium hydroxide or carbonate, at low temperature, for example, from about 0°C. to 25°C. during a period of from about 2 to 3 hours. Usually the protected amino acid or peptide will precipitate upon acidification of the mixture, and may be purified by any appropriate method such as recrystallization. Excess blocking reagent may be employed, even up to 0.5 molar excess, but equimolar quantities of reactants generally give better results.

The following Table I shows typical reaction conditions for a variety of X-groups within the scope of this invention.

TABLE I

| | Temperature, °C. | Time, hrs. | Carrier | Mole ratio, reagent:amino | Conditions |
|---|---|---|---|---|---|
| Cl | 0-25 | 2-3 | Organic solvent | 1:1 to 1.5:1 | Alkaline. |
| Br | 0-25 | 2-3 | do | do | Do. |
| I | 0-25 | 2-3 | do | do | Do. |
| N₃ | 0-25 | 3-5 | do | do | Neutral or alkaline. |
| Salk | 25-50 | 8-12 | do | do | Do. |
| —ON(succinimidyl) | 25-50 | 8-12 | do | do | Do. |
| —ON(phthalimidyl) | 25-50 | 8.12 | do | do | Do. |
| P—NO₂C₆H₄O— | 25-50 | 8-12 | do | do | Do. |
| 2,4-(NO₂)₂—C₆H₃O— | 25-50 | 8-12 | do | do | Do. |
| P—Cl—C₆H₅O— | 25-50 | 8-12 | do | do | Do. |
| 3,4-(Cl)₂—C₆H₃O— | 25-50 | 8-12 | do | do | Do. |
| 2,4,6-(Cl)₃—C₆H₂O— | 25-50 | 8-12 | do | do | Do. |
| 2,4,5-(Cl)₃C₆H₂O— | 25-50 | 8-12 | do | do | Do. |
| C₆Cl₅O— | 25-50 | 8-12 | do | do | Do. |
| (8-quinolyloxy) | 25-50 | 8-12 | do | do | Do. |
| (EtO)₂PO— | 25-50 | 8-12 | do | do | Do. |
| C₆F₅O— | 25-50 | 8-12 | do | do | Do. |
| CN | 25-50 | 8-12 | do | do | Do. |

The functional group attached to the carbonyl carbon atom in the blocking reagents of this invention is generally what is known in the art as a "leaving group." By this is meant a group which is readily broken away from its union with the carbon atoms. It is one which readily joins, for example, with an active hydrogen If the functional group attached to the carbonyl carbon is a hydrazino group the blocking reagent of this invention can be used to protect the carboxyl group of an amino acid. Such compounds can be prepared by reaction between a 9-fluorenylmethoxycarbonyl chloride and hydrazine hydrate in a reaction inert organic solvent at a temperature of from about 0°C. to 25°C. during a period of from about one to two hours. Suitable solvents include methylene chloride or other halogenated organic solvents containing up to about six carbon atoms.

The amino acid or peptide with the free carboxyl group to be protected is converted to the $N^2$-(9-fluorenylmethoxycarbonyl) derivative by reaction with the selected 9-fluorenylmethyoxycarbonyl hydrazide using dicyclohexyl carbodiimide as the dehydrating agent in a reaction inert, polar anhydrous organic solvent at a temperature of from about 20°C. to 40°C. during a period of about 1 to 24 hours. Suitable solvents include alcohols and esters containing up to about eight carbon atoms. During this reaction free amino groups on the amino acid or peptide must be protected with a suitable blocking agent, for example the phthalyl group, the carbobenzoxy group or another convenient group.

For further reaction the 9-fluorenylmethoxycarbonyl group can be removed by the procedure descibed below for its removal from amino groups. The resulting hydrazide of the original amino acid or peptide is converted to an azide by reaction with nitrous acid, usually formed by adding sodium nitrite to a solution of the hydrazide in strong acid, for example hydrochloric or acetic acid at a temperature of from about 0°C. to 80°C. The azide may then be used for normal coupling reactions with another amino acid or peptide.

Preparation of Peptides

The 9-flourenylmethoxycarbonyl group, once placed on the amino function to be protected is especially stable. This makes it possible to use a variety of methods for forming peptides without danger of cleavage of the protecting group. In fact the group is stable under conditions involved in the removal of most of the commonly used protective groups such as hydrogen bromide or chloride in various organic solvents, trifluoroacetic acid, hydrazine in ethanol and hydrogenolysis over palladium carbon. This is a particular advantage of the compounds of this invention which coupled with alkaline cleavage greatly increases the options available to the skilled peptide chemist for the preparation of complex polypeptides. The stability of the blocking group to hydrogenolysis is a surprising aspect of the invention when it is considered that this procedure is one of the methods of choice for the removal of the carbobenzoxy radical when this group is used for blocking.

For coupling an N-protected amino acid or peptide of this invention with a free amino group of another amino acid or peptide any of a wide variety of procedures are available. Generally speaking, most of the coupling procedures normally employed by the skilled practitioner can be used. Since these procedures are quite standardized they will not be discussed in detail.

The azide method can be employed. The use of activated esters, suitably aryloxy or thioaryl esters, especially substituted phenyl esters such as p-nitrophenyl esters leads to satisfactory results. In fact, most of the procedures used for the placement of the 9-fluorenylmethoxycarbonyl function for the protection of an amino group can be used for the coupling reaction.

One coupling procedure which is especially favored is to convert the protected amino acid or peptide to an N-hydroxy piperidine ester. This may be accomplished using dicyclohexylcarbodiimide. The ester is coupled with the amino group under alkaline conditions in a reaction inert, polar, organic solvent such as an ester, ether or alcohol containing up to about six carbon atoms. Any mild alkaline reagent such as alkali metal hydroxides, carbonates or bicarbonates, or alkali metal salts of lower aliphatic carboxylic acids can be employed. If the amino acid or peptide to be coupled is in the form of an ester sodium acetate in water is the preferred alkaline reagent. If it is in the form of a free acid sodium hydroxide is the preferred reagent. The reaction takes place at from about 15°C. to 30°C. during a period of from about 10 to 50 hours. It is generally most economical to use a slight molar excess, say up to about 20 percent molar excess of one of the reactants, although equimolar quantities can also be employed.

Cleavage of the Protecting Group

As mentioned above, a particular advantage of the reagents of this invention as blocking agents for amino acids and peptides is that they can be cleaved under mildly alkaline conditions. Another feature is that the conditions of cleavage can be varied by varying substituents on the fluorenyl group, especially the alpha carbon atom. This makes it possible to remove the protecting group under a variety of conditions specifically selected to avoid affecting other groups which may be present in the molecule. It is even possible to cleave the protecting group under acid as well as alkaline conditions if the alpha carbon atom is substituted with at least one aryl group or with two alkyl groups.

Any of a variety of non-hydrolytic alkaline reagents may be employed for removal of the protecting group. Liquid ammonia is preferred because of its ready availability and ease of operation especially removal by simple evaporation.

Primary, secondary and tertiary amines having a pK value of at least about 8 may be usefully employed. Typical examples of useful amines include triethyl amine, ethanolamine, morpholine, piperidine, diethyl amine and ethyl amine. With ammonia or ethanolamine the by-product of the reaction is dibenzofulvene which may contain a trace of dibenzofulvene polymer. The monomer may be removed by extraction with an organic solvent, for example, ether. The polymer is insoluble in water and normally separated by filtration after converting the amine acid or peptide from which the protecting group has been removed to a water soluble form.

The use of morpholine may sometimes be advantageous since morpholine forms an adduct with dibenzofulvene which precipitates and may be easily removed by filtration at the end of the reaction.

With liquid ammonia the reaction temperature is, of course, that at which the ammonia will remain a liquid. With alkaline reagents which are liquid at room temperature the reaction temperature is normally from about 0°C. to 30°C. Best results are obtained utilizing an excess of the alkaline reagent. For example, utilizing ethanolamine in dioxane for nonhydrolytic cleavage of the blocking group, it was found that the yield of deprotected product was 50 percent when the protected amine was aniline and the ratio of ethanolamine to protected amine was 5:1. The yield increased to approximately 100 percent when the ethanolamine to protected amine ratio was increased to 150:1. The time of the reaction will vary appreciably with the selected reaction temperature. Thus, if the reaction temperature is approximately room temperature the reaction is normally completed in from about 10 to 40 minutes, but with liquid ammonia the reaction period may extend up to several hours, for example, from about 4 to 16 hours.

This invention has been described principally with reference to the formation of peptides. As stated above, the invention is also applicable to the separation of racemic mixtures. Thus, a mono-substituted product of the invention will exist in the form of two optical isomers. These may be used to separate racemic mixtures of complex products particularly alkaloids, steroids, nucleotides, sugars, and the like, by the formation of 9-flyorenylmethoxycarbonyl derivatives of these compounds followed by fractional crystallization and cleavage of the 9-flourenylmethoxycarbonyl function utilizing the procedure described above. Racemic mixtures which may be separated in accordance with this procedure include, for example, tropanes, colchicine, anthocyanidines, O-β-D-glucosidotyrosine, and thymidylyldesoxydenosine.

The following examples are given by way of illustration only and are not to be considered limitations of this invention many apparent variations of which are possible without departing from the spirit or scope thereof. For convenience, the 9-fluorenylmethoxycarbonyl group is referred to as FMOC in the examples and the amino acids are sometimes indicated by their conventional abbreviations.

Example 1

Preparation of FMOC - Amino Acids

A solution containing 1 mmole of the amino acid and 2.5 mmoles of $Na_2CO_3$ in 2.7 ml of water is cooled in an ice bath and treated dropwise with a solution containing 1 mmole of FMOC - chloride in 2 ml of dioxane. The solution is stirred at room temperature for 2-3 hours, 50 ml of water added and the solution extracted with ether. The aqueous layer is acidified with concentrated HCl to Congo Red paper and the precipitate recrystallized from the appropriate solvent (see Table II for recrystallization solvent, m.p., etc.)

Table II

| Compound | Time hr. | m.p. (Rcry.Solv.) | Yield % | $\alpha_D$ (t,conc., solv.) |
| --- | --- | --- | --- | --- |
| FMOC-glycine | 2 | 174–5° ($CH_3NO_2$) | 89 | |
| FMOC-DL-alanine | 3 | 176–8° ($CH_3NO_2$) | 88 | |
| FMOC-L-alanine | 2 | 144–5° ($EtOAc-Et_2O$) | 94 | –3.48 928.6° 2.5, EtOAc) |
| FMOC-β-alanine | 3 | 145–7° (EtOAc) | 91 | |
| FMOC-L-leucine | 2 | 155–6° (EtOAc) | 90 | –4.44 (28.3° 2.5, EtOAc) |
| FMOC-L-phenylalanine | 2 | 183–5° (EtOAc) | 92 | +11.6 (28.2° 1.2, EtOAc) |

FMOC-glycine ethyl ester, m.p. 178-7° ($CH_3CN$) in 92 percent yield and FMOC-glycylglycine, m.p. 110-112° ($EtOAc-Et_2O$) in 94 percent yield are similarly prepared.

Similar results are obtained with substituted FMOC compounds including
1-Br-FMOC-chloride
2-Cl-FMOC-chloride
2,7-diiodo-FMOC-chloride
2,7-dinitro-FMOC-chloride.

Example 2

Preparation of N-hydroxypiperidine Esters

To a solution of 1 mmole of the FMOC-amino acid and 1.1 mmole of N-hydroxypiperidine in 10 ml. of anhydrous EtOAc there is added 1 mmole of N,N-dicyclohexylcarbodiimide and the solution stirred for 1–24 hours. The urea is filtered, washed with EtOAc and the filtrate then washed with 5 percent HCl, NaCl solution, 5 percent $NaHCO_3$ and again with NaCl solution. After drying over $MgSO_4$, evaporation gives the ester which is recrystallized from $Et_2O$-ligroin (b.p. 30°–60°). The results are shown in Table III.

Table III

| FMOC – Amino Acid N-piperidyl Esters | | | | |
| --- | --- | --- | --- | --- |
| Compound | Time hrs | m.p. Rcry. Solv. | Yield | $\alpha_D$(t,conc., solv.) |
| FMOC-gly-$ONC_5H_{10}$ | 1 | 123.5°dec.($Et_2O$) | 86 | |
| FMOC-L-phe-$ONC_5H_{10}$ | 5 | 60–62°dec.($Et_2O$) | 98 | –2,68(28.2°, 2.5 EtOAc) |
| FMOC-L-ala-$ONC_5H_{10}$ | 15 | 48–50° ($Et_2O$) ligroin,b.p.60–70° | 96 | +4.65(27.4°, 2.5, EtOAc) |
| FMOC-L-leu-$ONC_5H_{10}$ | 23 | 55–56°dec. ($Et_2O$– ligroin,b.p.60–70°) | 91 | –3.45(27.8°, 2.5, EtOAc) |

Similar results are obtained with the substituted FMOC derivatives listed above.

Example 3

Preparation of FMOC - dipeptides

A. To a solution of 1 mmole of the FMOC-amino acid N-hydroxypiperidine ester in 2 ml of dioxane there is added at room temperature 1.2 mmoles of NaOAc. $3H_2O$ and 1.2 mmoles of an amino acid ester hydrochloride. The mixture is stirred at room temperature for 15–24 hours and then poured into 100 ml of water and the precipitate recrystallized from the appropriate solvent (Table IV).

B. For coupling to a free amino acid 1.0 mmole of the FMOC-N-hydroxypiperidine ester in 5 ml of dioxane is treated with a solution of 1.2 mmole of a free amino acid and 1.2 mmoles of NaOH in 2 ml of water. The solution is stirred for 2–48 hours at room temperature, 50 ml of water added and the mixture extracted with ethyl acetate. The aqueous layer is acidified with concentrated HCl to Congo Red and the precipitate recrystallized from the appropriate solvent (Table IV).

Table IV

| Compound | Time hrs. | FMOC – Dipeptides m.p. (Recry.solv.) | Yield % | $\alpha_D$(t.conc. solv.) |
|---|---|---|---|---|
| FMOC-gly-gly-OEt | 24 | 131.15–132.5 (EtOAc–Et$_2$O) | 83 | |
| FMOC-gly-L-leu-OMe | 20 | 146–8°dec. (EtOAc–Et$_2$O) | 100 | |
| FMOC-L-ala-gly-OEt | 17 | 153–5°(EtOAc-ligroin,b.p.60–70°) | 100 | −20.84(27.7°, 2.5, CHCl$_3$) |
| FMOC-β-ala-gly-OEt | 20 | 129–30°dec. (Et$_2$O) | 95 | |
| FMOC-L-leu-gly-OEt | 20 | 136–140°dec. (Et$_2$O) | 100 | |
| FMOC-gly-gly-OH | 2 | 177–9° (CH$_3$CN) | 77 | |

Similar results are obtained with the substituted FMOC derivatives listed above.

Example 4

This example illustrates one general procedure by which FMOC groups are removed using ammonia.

A mixture of 1.55 g (4 mmoles) of FMOC-L-phenylalanine in approximately 250 ml of liquid ammonia is stirred for 10 hours and then allowed to evaporate to dryness. The mixture is treated with ether to remove dibenzofulvene and the insoluble material dissolved in the minimum amount of water (a trace of dibenzofulvene polymer is removed by filtration). Evaporation of the water solution gives 0.66 g (100 percent) of phenylalanine $[\alpha]_D^{27}$ −33.20 (1.992, H$_2$O), identified by its infrared spectrum. The phenylalanine from which the above FMOC-derivative is prepared has $[\alpha]_D^{26.7}$ −33.24 (1.962, H$_2$O).

Similar procedures are employed to remove the FMOC group from the dipeptides illustrated in Example 3 and from a sample of protected glycyl-glycyl-glycine.

Example 5

This example illustrates one general procedure by which FMOC groups are removed using an amine.

A mixture of 0.1 of FMOC glycine ethyl ester in approximately 10 ml of piperidine is left standing for 0.5 to 2 hours and 200 ml of water is added. The precipitate which forms as the water is added is the adduct of dibenzofulvene and piperidine (100 percent yield). It is removed by filtration and the filtrate is evaporated to dryness. The residue is useful with ethanol to dissolve a trace of residual piperidine and leave the desired product.

Example 6

Preparation of Oxytocin

To a solution of 1.0 mmole of FMOC-L-leu-N-hydroxypiperidine ester in 2 ml of dioxane there is added at room temperature 1.2 mmoles of NaOAc.3-H$_2$O and 1.2 mmoles of glycinamide. The mixture is stirred at room temperature for 24 hours, poured into 100 ml of water and the peptide amide filtered and cleaved in 75 ml of liquid ammonia using the general procedure of Example 4. After stirring for 10 hours the ammonia is allowed to evaporate and the mixture treated with ether to remove dibenzofulvene. The resulting L-leu-gly-NH$_2$ is treated in the same way as described above with 1.0 mmole of FMOC-L-Pro-N-hydroxypiperidine ester and 1.2 mmoles of NaOAc.3-H$_2$O in 2 ml of dioxane. Work-up as before followed by cleavage in liquid ammonia yields L-Pro-L-leu-gly-NH$_2$ which is coupled stepwise in the same way with the following FMOC-derivatives (Bzl is benzyl):

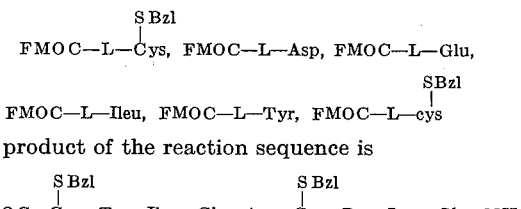

The product of the reaction sequence is

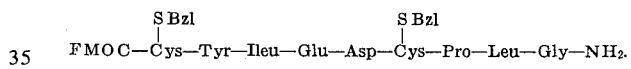

Cleavage with sodium in liquid ammonia removes both the FMOC and S-benzyl groups and upon air oxidation of the polyeptide, oxytocin results. Alternatively, the FMOC group is removed in liquid ammonia as described above, and the benzyl group thereafter removed with sodium in liquid ammonia.

What is claimed is:

1. A compound of the formula

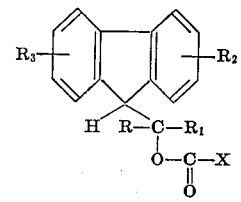

wherein each of R and R$_1$ is hydrogen, each of R$_2$ and R$_3$ is hydrogen, fluorine, chlorine, bromine, iodine or nitro, and X is chlorine, fluorine, bromine, thioalkyl or thioaryl wherein the alkyl or aryl group contains up to about 10 carbon atoms, aryloxy, halo substituted aryloxy and nitro substituted aryloxy, each aryloxy group containing up to about ten carbon atoms.

2. A compound as in claim 1 wherein X is chlorine.

* * * * *